(No Model.)

A. ENTWISTLE.
CAMERA SHUTTER.

No. 496,512. Patented May 2, 1893.

Witnesses.
Oliver H. Arnold
Graham Kilvert

Inventor
Alexander Entwistle
by his attorney
Warren R. Perce

UNITED STATES PATENT OFFICE.

ALEXANDER ENTWISTLE, OF BRISTOL, RHODE ISLAND.

CAMERA-SHUTTER.

SPECIFICATION forming part of Letters Patent No. 496,512, dated May 2, 1893.

Application filed April 14, 1892. Serial No. 429,088. (No model.)

*To all whom it may concern:*

Be it known that I, ALEXANDER ENTWISTLE, of the town and county of Bristol, in the State of Rhode Island, have invented a certain new and useful Improvement in Camera-Shutters; and I declare the following to be a specification thereof, reference being had to the accompanying drawings.

Figure 1:
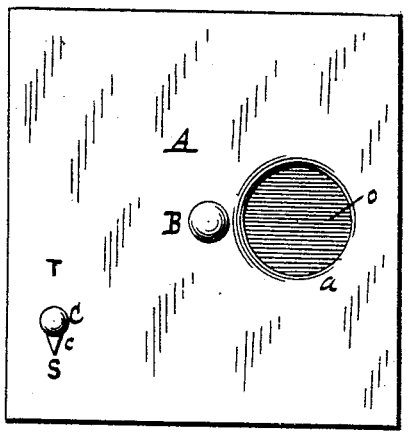
Figure 7:
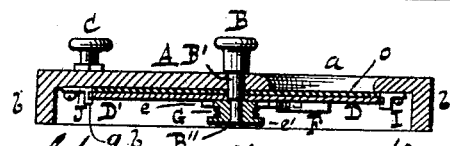

Figure 1 is an elevation of the front or end piece of a camera, having my invention. Figs. 2, 3, 4, 5 and 6 are rear elevations of my invention, showing the operative parts in various positions, as hereinafter fully explained. Fig. 7 is a sectional view, on line $xx$ of Fig. 5.

Like letters indicate like parts.

My invention relates to the shutter mechanism of that class of photographic instruments, known as "detective cameras" and it consists in the novel construction and means for operating the exposing-shutters of such cameras, as hereinafter specified and particularly set forth in the claims.

The end piece or shutter support A of the camera has the usual aperture $a$ for the admission of light and with its sides $b$ and the front side of the camera forms a light-tight chamber, in which the shutter-mechanism is contained. On the front of the shutter support A and at or near its center, is the knob B. Near one corner is the knob C of the releasing device and a pointer $c$, which, turning with the knob C, may be set at either of the points marked T and S, which initials indicate, respectively, the positions of a timed exposure or an instantaneous exposure, commonly called a "snap shot."

The knob B has rigidly attached thereto a stem or shank B' and said stem has an extension B'' of slightly smaller diameter, but integral therewith, (see Fig. 7.)

The dotted circles in Figs. 2, 3, 4 and 5 indicate the aperture $a$.

The shutter is made preferably of sheet metal or any other thin, flat and stiff material and consists of two disks D D' and a central portion D'', the latter having a central perforation to allow the stem B' to pass loosely through it. These disks D D' and central connections D'' are all made in one piece and have an oscillating movement on the stem B', as hereinafter specified. Each of said disks D D' has, respectively, the projections or lugs $d\ d'$, as shown.

On the disk D is pivotally mounted a pawl E, having a bent and beveled end and a spring F, mounted on said disk, has its free end bearing against said pawl.

On the extended stem B'' is firmly mounted a drum or pulley G with two flanges $e\ e'$, the former of which is a ratchet disk with two indents $z\ z'$, diametrically opposite each other. The flange $e'$ is extended at one side to form an arm H, whose outer end is rounded as shown at $h$. These parts G H $e\ e'$ all are moved by the stem B' B'', which is operated by the knob B. On the back of the shutter support A near the edge of the aperture $a$ as seen in Fig. 7, there is a pivotally mounted pawl I, and having a beveled point and a turned-up end, (see Fig. 7.) A spring $f$ bears against this pawl I to keep the free end of said pawl normally in the position shown in Fig. 7. On the opposite side is a tripping lever J, pivotally mounted at its center and having its ends $g\ g'$ bent at right angles, as shown in the several figures. A bent spring K, hung on a fulcrum $p$, bears against the end $g$ of the lever J. A spring L, fastened to the shutter support A at $i$ and provided with a coil $j$, has a bearing on the fulcrum pin $k$. A cord M, of catgut or other strong but flexible material is fastened to the end of the spring L and the other end of said cord is fastened to the drum or pulley G. N is a stop and $l$ and $m$ are stop pins. The knob C has a stem C' to which it is firmly secured and a plate having the cams $n\ n'$, is fastened to said stem. The shutter disks D D' have a lining $o$ of felt or other suitable material to exclude the light.

Figure 2:
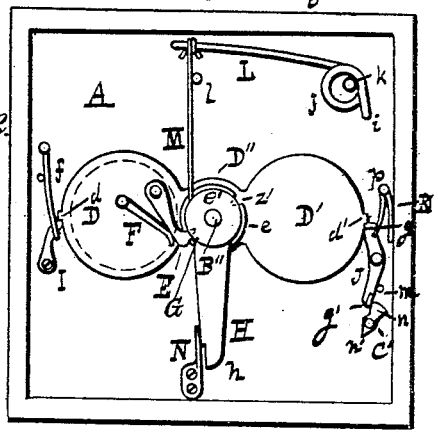
Figure 3:
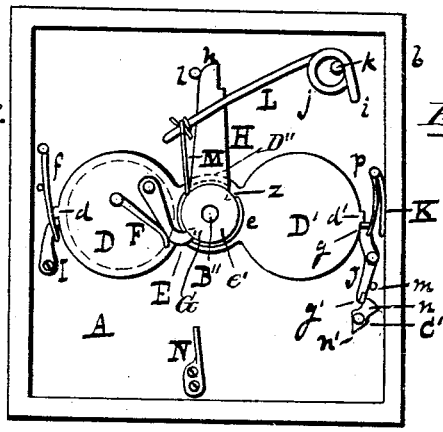
Figure 4:
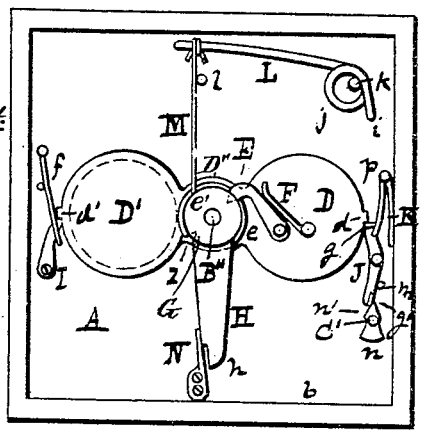
Figure 5:
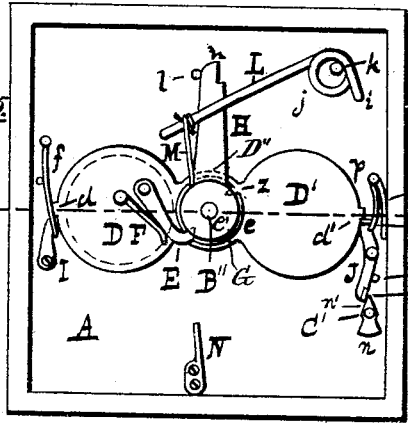
Figure 6:
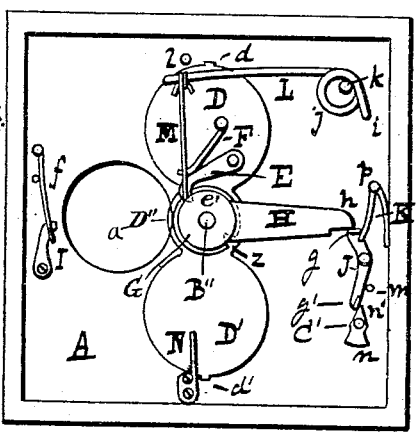

Having thus described the several parts of my device, I will proceed to explain their purpose and operation. The normal position of the parts is shown in Fig. 2. The pointer $c$, being set at S, as seen in Fig. 1, causes the cam $n$ to lie in contact with the end $g'$ of the lever J. To have the shutter-mechanism work properly for an instantaneous exposure, I turn the knob B a half revolution in the direction of the movement of the hands of a watch. This movement turns the indent $z$ of the ratchet disk $e$ out of engagement with the pawl E and when the arm H has been turned ninety degrees, its end $h$ crowds out the end $g$ of the lever J, so that the end of the arm passes by said lever. When said arm has been turned one hundred and eighty degrees, it comes against the stop pin $l$ and the indent $z'$, having now come opposite the end of the pawl E, receives the end of said pawl, because the spring F compels such engagement. In this half revolution of the knob and its connected parts, the shutter has not turned, however, because it is loosely mounted on the stem B' of the knob and the pawl I, bearing against the projection $d$ of the disk D, prevents the shutter from moving in the same direction as the knob turns, and thus the aperture $a$ remains covered. This movement of the arm, caused as above stated by the half-revolution of the knob B, carries the drum or pulley G (whose flange $e'$ is integral with said arm H) half around and winds the cord M upon said drum and pulls down the spring L. The tripping lever J, being in engagement with the lug $d'$ of the disk D' prevents the return movement. The parts are now in the position shown in Fig. 3. Now, by turning the knob C in the direction of the movement of the hands of a watch, the cam $n$, bearing against the end $g'$, of the pawl lever J, withdraws the end $g$ from the lug $d'$ of the disk D'. The spring L, being now free to act, pulls the cord M and causes the drum G to turn in the direction opposite to its former movement and as the disk D is held to the ratchet disk $e$ by the pawl E, this return movement carries the disk D around to the position shown in Fig. 4, the lug $d$ of the disk D crowding past the beveled end of the pawl I, which, as soon as said lug has passed is thrown by the action of the spring $f$ into the position shown in said Fig. 4 to prevent a reverse rotation of the shutter-disk. The aperture $a$ is thus opened for an instantaneous exposure of the plate or film. For a time exposure the pointer $c$ is set at T, (see Fig. 1,) and the parts are in the position shown in Fig. 5. The cam $n'$ is now in contact with the end $g'$ of the pawl lever J and when the knob C is turned as before, the cam $n'$ moves the tripping lever J sufficiently to carry its end $g$ out of engagement with the lug $d'$ of the disk D'. By the action of the spring L, the drum G is revolved in the manner already described, and the arm H strikes on the end $g$ of the pawl lever J and holds there, thus leaving the aperture $a$ open. When the exposure has continued as long as desired, the tripping device C C' is turned around till the cam $n$ again trips the lever and brings the parts once more into the position shown in Fig. 2. The radius of the cam $n$ is longer than that of the cam $n'$. As a result when the cam $n$ trips the lever J, it withdraws it from the lug $d'$ of the disk D' so far that before its return the lug $d'$ and the arm H can pass by without being caught by said lever, but when the lever J is tripped by the cam $n'$ it is withdrawn only a short distance, sufficient to allow the lug $d'$ to pass by, but not enough to allow the arm H to pass by, so that the arm H strikes on the end $g$ of the pawl lever J and is detained there, as in Fig. 6. This shutter is therefore capable of use interchangeably as a time or instantaneous shutter.

I claim as a novel and useful invention and desire to secure by Letters Patent—

1. In a camera shutter, the combination of a shutter support, having an aperture $a$, the knob B and stem B', the shutter disks D D', mounted and rotatable on said stem and having the lugs $d$ $d'$, the pulley G, fastened to the inner end of the stem B' and having the flanges $e$ $e'$, the former of which has ratchet teeth and the latter of which is extended to form the arm H, the cord M wound on said pulley, the spring L adapted to draw the cord, the pawls E and I, the stops $l$ N, all arranged and operating as set forth and the pawl J, pivoted to the shutter support A and provided with the bent ends $g$ $g'$, and a tripping device adapted to disengage the end $g$ of the pawl J from the lug of the adjacent shutter disk, substantially as specified.

2. In a camera shutter, the combination of a shutter support having the aperture $a$, the stem B', the rotatable shutter disks D D', having the lugs $d$ $d'$ and mounted on said stem, the pulley G, fastened to the inner end of the stem B' and having the ratchet flange $e$ and flange $e'$ extended to form the arm H, the cord M wound upon said pulley, the spring L adapted to draw said cord, the pawl E J, all arranged and operating as set forth and the knob C having the stem C' and cam plate $n$ $n'$ adapted to trip the pawl J, substantially as specified.

ALEXANDER ENTWISTLE.

Witnesses:
P. SKINNER, Jr.,
EDWIN A. SKINNER.